(12) United States Patent
Eriksson et al.

(10) Patent No.: US 7,220,215 B2
(45) Date of Patent: May 22, 2007

(54) MOTORIZED TRUCK

(75) Inventors: Anders Eriksson, Göteborg (SE); Marcus Steén, Angered (SE)

(73) Assignee: Volvo Lastvagnar AB, Gothenburg (SE)

( * ) Notice: Subject to any disclaimer, the term of this patent is extended or adjusted under 35 U.S.C. 154(b) by 197 days.

(21) Appl. No.: 10/500,886

(22) PCT Filed: Jan. 8, 2003

(86) PCT No.: PCT/SE03/00012

§ 371 (c)(1),
(2), (4) Date: May 6, 2005

(87) PCT Pub. No.: WO03/058093

PCT Pub. Date: Jul. 17, 2003

(65) Prior Publication Data

US 2005/0221950 A1    Oct. 6, 2005

(30) Foreign Application Priority Data

Jan. 10, 2002    (SE)    .................................... 0200063

(51) Int. Cl.
*B60W 10/04*    (2006.01)
(52) U.S. Cl. .................................................... 477/107

(58) Field of Classification Search ................ 477/107, 477/110, 111
See application file for complete search history.

(56) References Cited

U.S. PATENT DOCUMENTS

| | | | |
|---|---|---|---|
| 5,479,345 A | 12/1995 | Amsallen | |
| 6,394,931 B1 | 5/2002 | Genise | |
| 6,519,522 B1 | 2/2003 | Wolf et al. | |
| 2006/0183599 A1* | 8/2006 | Steen et al. | ................ 477/166 |

FOREIGN PATENT DOCUMENTS

| | | |
|---|---|---|
| DE | 198 39 837 | 9/2000 |
| WO | WO 01/72546 | 10/2001 |

* cited by examiner

*Primary Examiner*—Dirk Wright
(74) *Attorney, Agent, or Firm*—Young & Thompson

(57) ABSTRACT

Motor-driven cargo vehicle with an automated clutch (33) and gearbox (39) between the engine (31) and the vehicle drive wheels. The gearbox and the clutch are controlled by an electronic control unit (19) depending on a set position of a manual gear selector (53). The control unit is arranged, when starting off with the gear selector in the position for automatic shifting, to select the highest gear speed which makes starting off of the vehicle possible with the available torque at engine idle speed, introducing an amount of energy from the engine to the clutch which at most amounts to a predetermined maximum value.

6 Claims, 2 Drawing Sheets

Figure 3:
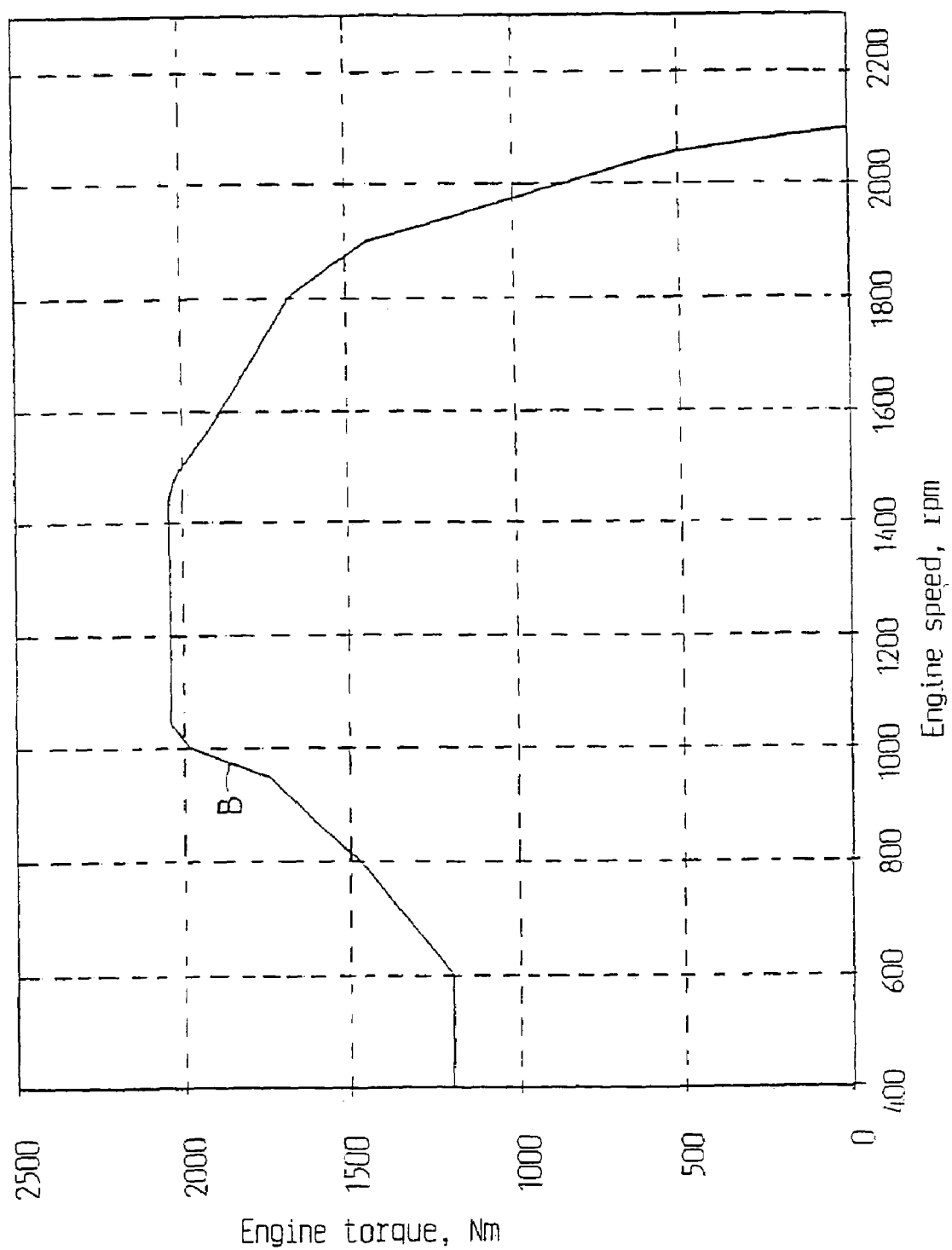

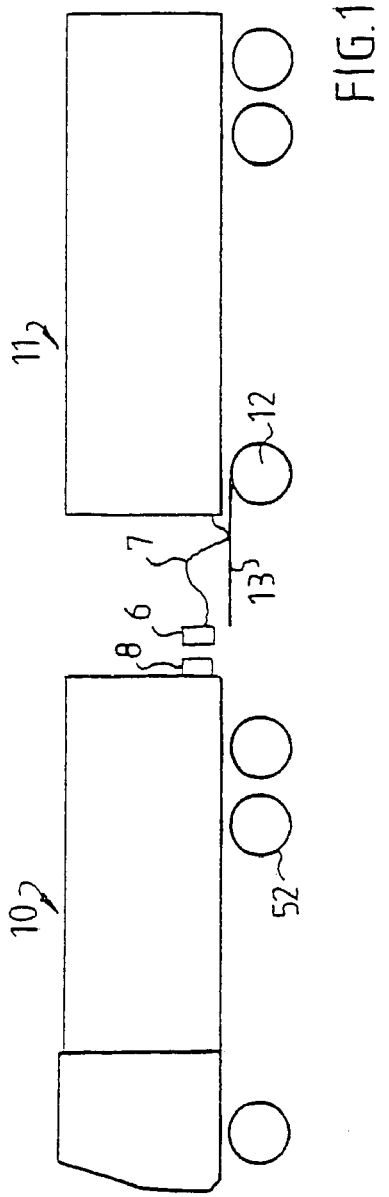
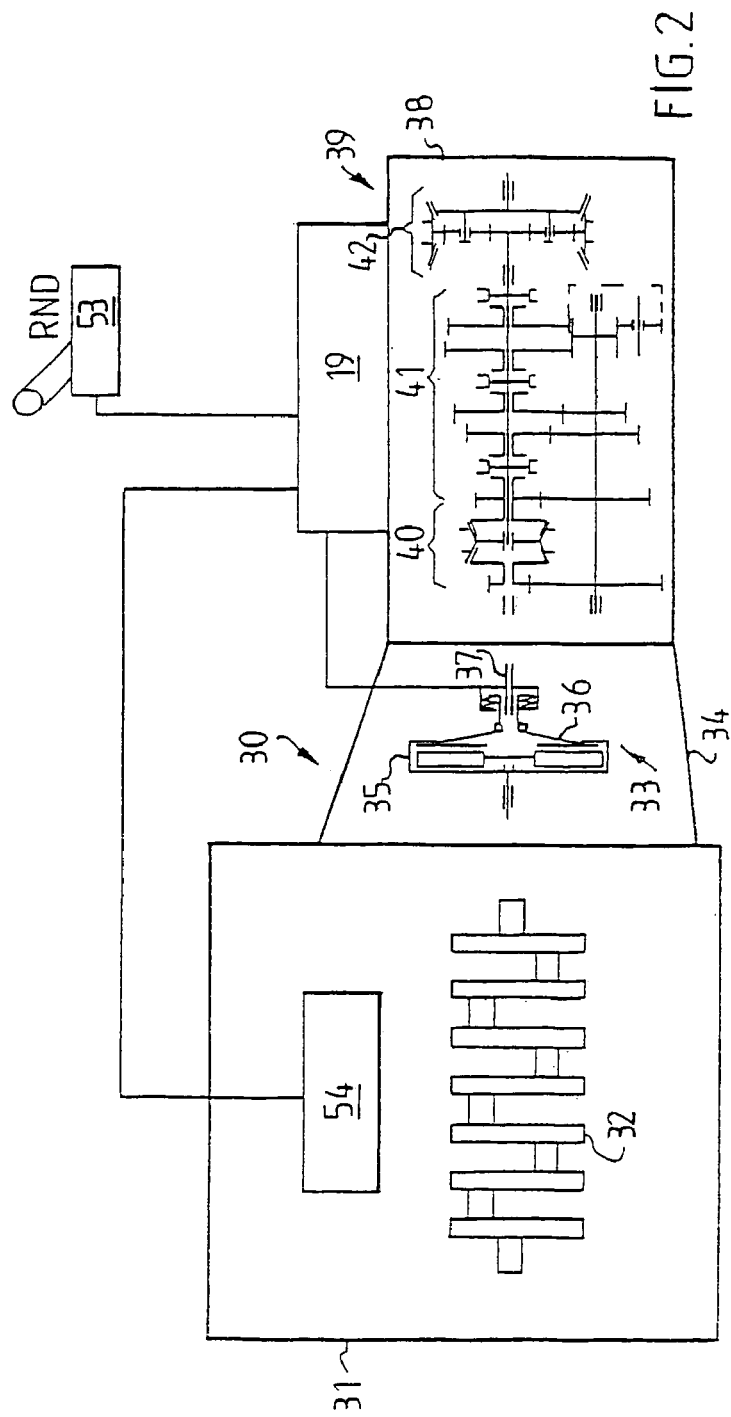

MOTORIZED TRUCK

The present invention relates to a motor-driven cargo vehicle with an automated clutch and a transmission between the engine and the vehicle drive wheels, comprising an electronic control unit for controlling the engine, and an electronic control unit for controlling the transmission and the clutch, depending on a set position of a manual gear selector, said control unit being arranged, with the gear selector in a position for automatic shifting at starting off, to select a starting-off gear speed which is determined by a gear selection strategy stored in the control unit, which is dependent on various control parameters fed into the control unit, which comprise at least road incline and vehicle weight In cargo vehicles of this type the gear selector, in addition to an automatic shift position, has other positions for the selection of gears, so that the driver can manually select what gear he wishes to start off in. When the driver sets the gear selector in the automatic position, the transmission control unit normally selects the starting-off gear, taking into account the vehicle weight, road incline, driving resistance, etc. The starting-off gear is selected in this case with a view to optimum fuel economy and so that the clutch slippage will not exceed a predetermined time period for a given vehicle weight and road incline. This normally involves a gear selection strategy, where a loaded vehicle starts off in first gear and high split stage.

The wear in a disc clutch is strongly dependent on the slip rpm in the clutch, more specifically the wear is proportional to the clutch input torque and to the square of the difference between the input and output rpm:s.

The purpose of the present invention is, in a motor vehicle of the type described by way of introduction to control and limit the disc wear but at the same time preserve good comfort. Good comfort is often obtained by starting off in a high gear, which provides more even acceleration with a longer period of driving in the starting-off gear. Starting off in a higher gear provides for a fewer number of power gaps due to fewer gear shifts during the acceleration phase and it also contributes to a higher total acceleration of the vehicle.

This is achieved according to the invention by virtue of the fact that the transmission control unit is arranged at starting off to select the highest gear speed making starting off of the vehicle possible with the engine torque available at engine idle speed, introducing an amount of energy from the engine to the clutch amounting, at most, to a predetermined maximum value.

By selecting the lowest engine rpm, i.e. idle rpm, and the highest gear speed which the vehicle can start off in at the given criteria, the smallest possible rpm difference is achieved at starting off, which results in the minimum possible disc wear. The engine rpm at starting off is determined by the starting-off strategy stored in the engine control unit. A typical idle speed for diesel engines in heavy trucks is circa 600 rpm. This means that the available engine torque is determined by the predefined characteristic of the engine, and a typical torque at said idle rpm is circa 800 Nm for the engine type in question.

The transmission control unit selects the highest gear which provides a maximum value of the energy fed into the clutch, not exceeding a predetermined value, e.g. circa 200 kJ. If no gear fulfils this criterion, the lowest possible gear speed is selected.

The engine control unit is arranged, at the request of the transmission control unit—if the engine torque at idle rpm is not sufficient to start off the vehicle at the lowest gear within a predetermined time period, e.g. circa 2 seconds, due to vehicle weight and/or road incline—to increase the engine speed, e.g. to circa 1000 rpm, where the engine can deliver higher torque, first circa 1100 Nm and after a few seconds circa 1500 Nm (due to the turbo effect).

The invention will now be described in more detail below with reference to examples shown in the accompanying drawings, where FIG. 1 shows a schematic side view of a full truck with a detached trailer, FIG. 2 is a schematic representation of an internal combustion engine with clutch and transmission, and FIG. 3 is a diagram of a curve illustrating maximum engine torque at various engine speeds.

In FIG. 1, 10 designates a standard full truck, and 11 designates a trailer with a steer-able front axle 12, which is joined by a pull rod 13. In the Figure, the trailer 11 is detached from the pulling vehicle 10. When connecting the trailer 11, the pulling vehicle 10 is backed towards the trailer so that the pulling rod 13 can be connected to a trailer hitch (not shown) on the pulling vehicle 10. After connecting the trailer, a connector 6 on an electric cable 7 is connected to an electrical outlet on the pulling vehicle for current supply to the reverse lights, brake lights, side lights, etc. of the trailer 11.

FIG. 2 shows a drive unit 30 for the pulling vehicle 10. The drive unit 30 comprises, in the example shown, a six-cylinder engine 31, e.g. a diesel engine, the crankshaft 32 of which is coupled to a single-plate dry disc clutch, which is generally designated by the reference numeral 33, and is enclosed in a clutch case 34. The crankshaft 32 is connected non-rotatably to the clutch housing 35 of the clutch 33, while its disc plate 36 is non-rotatably connected to an input shaft 37, which is mounted rotatably in the casing 38 of a gearbox, designated generally by reference numeral 39, and which in the example shown consists of a split gearing portion 40, a main portion 41 and a range portion 42. The gearbox 39 drives the drive wheel 52 of the pulling vehicle 10 and is controlled by an electronic transmission control unit 19 in response to, on the one hand, the position of a manual gear selector 53 and, on the other hand, to various signals fed into the control unit 19 from sensors (not shown in more detail here), which provide i.a. information on vehicle weight and road incline. The engine 31 is controlled by an electronic engine control unit 54.

The gear selector 53 has a neutral position N and two automatic drive positions D (forward) and R (reverse) and possibly other positions as well, so that the driver can select gears manually. In the positions D and R, the transmission control unit 19 selects a gear automatically at starting off and during driving forward and when driving in reverse. According to the invention, the transmission control unit 19 is programmed, in response to information fed in concerning vehicle weight (train weight), road incline, driving resistance, etc. at start, to select the highest starting-off gear possible at idle rpm for the engine 31, typically circa 600 rpm, and which provides a maximum value for energy fed into the clutch 33, not exceeding a predetermined value, typically circa 200 kJ. If no gear speed fulfils these conditions, the transmission control unit 19 selects the lowest gear for the gearbox 39.

The transmission control unit is programmed so that if the available engine torque at idle is not sufficient to start off the vehicle in the lowest gear speed in a prede-termined time period, e.g. circa 2 seconds, then the engine rpm will be raised to a starting-off rpm, which is higher than the idle rpm, preferably 1000 rpm, where the engine can deliver higher torque. A turbo-charged engine with the characteristic illustrated in the diagram in FIG. 3, where the curve B illustrates the maximum permissible torque at various rpm:s, provides at idle speed ca 600 rpm an available torque at that time of circa 800 Nm and at 1000 rpm an available torque at that time of circa 1100 Nm. The available torque at that time is circa 60% of the maximum permissible torque. The difference is dependent on the turbo effect. After a few seconds, the available starting-off torque from the engine with the characteristic shown in FIG. 3 is circa 1500 Nm at 1000 rpm.

The invention claimed is:

1. Motor driven cargo vehicle with an automated clutch (33) and a transmission (39) between the engine (31) and the vehicle drive wheels (52), comprising an electronic control unit (54) for controlling the engine, and an electronic control unit for controlling the transmission and the clutch, depending on a set position of a manual gear selector (53), said control unit being arranged, with the gear selector in a position (D) for automatic shifting at starting off, to select a starting-off gear speed which is determined by a gear selection strategy stored in the control unit, which is dependent on various control parameters fed into the control unit, which comprise at least road incline and vehicle weight, characterized in that the transmission control unit (19) is arranged at starting off to select the highest gear speed making starting off of the vehicle (10) possible with the engine torque available at engine idle speed, introducing an amount of energy from the engine (31) to the clutch (33) amounting, at most, to a predetermined maximum value.

2. Motor-driven cargo vehicle according to claim 1, characterized in that the transmission control unit (19) is arranged—if no gear speed makes possible starting off of the vehicle with the available engine torque at engine (31) idle speed when introducing an amount of energy amounting to said predetermined maximum value—to select the lowest gear speed of the transmission (39).

3. Motor-driven cargo vehicle according to claim 2, characterized in that the engine control unit (54) is arranged—if the torque at engine (31) idle speed is insufficient to start off the vehicle within a predetermined period of time in the lowest gear speed—to raise the engine speed to an rpm which is higher than the idle rpm at the request of the transmission control unit (19).

4. Motor-driven cargo vehicle according to claim 1, characterized in that the engine control unit (54) is arranged, at the request of the transmission control unit (19), to keep the engine at an idle rpm of approximately 600 rpm and a predetermined maximum value of the introduced amount of energy of approximately 20 kJ.

5. Motor-driven cargo vehicle according to claim 2, characterized in that the engine control unit (54) is arranged, at the request of the transmission control unit (19), to keep the engine at an idle rpm of approximately 600 rpm and a predetermined maximum value of the introduced amount of energy of approximately 20 kJ.

6. Motor-driven cargo vehicle according to claim 3, characterized in that the engine control unit (54) is arranged, at the request of the transmission control unit (19), to keep the engine at an idle rpm of approximately 600 rpm and a predetermined maximum value of the introduced amount of energy of approximately 20 kJ.

* * * * *